(12) United States Patent
Ingram (10) Patent No.: US 10,257,069 B1
(45) Date of Patent: Apr. 9, 2019

(54) SYSTEMS AND METHODS FOR PROVIDING AN ADMINISTRATIVE FRAMEWORK IN A CLOUD ARCHITECTURE

(71) Applicant: Carl B. Ingram, Chandler, AZ (US)

(72) Inventor: Carl B. Ingram, Chandler, AZ (US)

( * ) Notice: Subject to any disclaimer, the term of this patent is extended or adjusted under 35 U.S.C. 154(b) by 0 days.

(21) Appl. No.: 15/708,046

(22) Filed: Sep. 18, 2017

Related U.S. Application Data (63) Continuation-in-part of application No. 15/376,972, filed on Dec. 13, 2016, which is a continuation-in-part of application No. 14/555,187, filed on Nov. 26, 2014.

(60) Provisional application No. 61/909,546, filed on Nov. 27, 2013.

(51) Int. Cl.
| | | |
|---|---|---|
| *G06F 17/30* | (2006.01) | |
| *G06F 21/62* | (2013.01) | |
| *H04L 12/24* | (2006.01) | |
| *H04L 12/26* | (2006.01) | |
| *H04L 29/08* | (2006.01) | |

(52) U.S. Cl.
CPC ........ *H04L 43/14* (2013.01); *G06F 17/30073* (2013.01); *G06F 21/6218* (2013.01); *H04L 41/0806* (2013.01); *H04L 41/0893* (2013.01); *G06F 2221/2141* (2013.01); *H04L 67/10* (2013.01)

(58) Field of Classification Search
CPC . H04L 43/14; H04L 41/0806; H04L 41/0893; H04L 67/10; G06F 17/30073; G06F 21/6218; G06F 2221/2141
See application file for complete search history.

(56) References Cited

U.S. PATENT DOCUMENTS

| | | |
|---|---|---|
| 9,495,143 B2 | 11/2016 | Mellor |
| 2010/0223385 A1 | 9/2010 | Gulley |
| 2011/0022812 A1 | 1/2011 | van der Linden |
| 2011/0093471 A1* | 4/2011 | Brockway ......... G06F 17/30616 707/747 |
| 2013/0132440 A1* | 5/2013 | Carlson ............... G06Q 10/06 707/792 |
| 2014/0278703 A1* | 9/2014 | Owens, Jr. ....... G06Q 10/06313 705/7.23 |
| 2015/0033365 A1 | 1/2015 | Mellor |
| 2015/0135300 A1* | 5/2015 | Ford ................. H04L 67/1097 726/11 |
| 2015/0163206 A1* | 6/2015 | McCarthy ........... G06F 21/6227 713/171 |
| 2016/0048936 A1* | 2/2016 | Perkowski .......... G06Q 50/184 705/310 |
| 2016/0323173 A1* | 11/2016 | Bivens ............. G06Q 10/06393 |
| 2017/0147588 A1* | 5/2017 | Maller ............. G06F 17/30085 |

\* cited by examiner

*Primary Examiner* — Davoud A Zand
(74) *Attorney, Agent, or Firm* — Mark V. Loen (57) ABSTRACT

The invention is an eighth layer cloud administrative framework that provides for both monitoring users and providing needed software. The cloud framework guides software tool implementation so that users can accomplish business tasks efficiently.

3 Claims, 7 Drawing Sheets

SYSTEMS AND METHODS FOR PROVIDING AN ADMINISTRATIVE FRAMEWORK IN A CLOUD ARCHITECTURE

CROSS REFERENCE TO RELATED APPLICATIONS

This application is a continuation in part of U.S. application Ser. No. 15/376,972 filed on Dec. 31, 2016, which is a continuation in part of U.S. application Ser. No. 14/555,187 filed on Nov. 26, 2014 which claims the benefit of U.S. Provisional Application No. 61/909,546 filed Nov. 27, 2013. The above referenced prior applications are incorporated by reference herein.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION

(1) Field of the Invention

This invention is directed toward a software implemented program that provides cloud administrative services.

(2) Description of Related Art

Others have been working in the field of cloud and software administration. Some companies utilize a number of cloud services and, additionally, provide software that allows a user to perform tasks specific to the company's mission.

Microsoft Azure is one available commercial system, but it only has the ability to coordinate Microsoft software.

Cloud services enable small businesses to enjoy the benefits of highly useful business software without having to pay for equipment costs and computer infrastructure. Storage and software are available 'on line' and can be accessed from any location by use of a mobile or computer platform. The "anywhere, anytime" nature of the available cloud services means better collaboration among business users (and companies) by only needing to use an internet browser. Cloud services provide entrepreneurs, home office, and mom-and-pop outfits access to sophisticated technology without the need of an IT consultant or tech worker on the payroll.

Cloud services also includes the ability to use common office software on a monthly, quarterly, or annual cost. It can also include the use of certain office software (that are based on a one time payment to purchase) features that include collaboration (document sharing) and backup storage.

Typical office software comprises word processing, spreadsheet, presentation, email management, calendar, and accounting software.

The use of cloud services and cloud based software raises business concerns about security, stability, and data ownership. Also there are concerns about cloud outages. Business may be reluctant to implement a complete cloud computing environment due to these issues.

Additionally, it is common for a business to utilize specialized software to accomplish certain tasks based on the business mission. For example, special software may be used for document management in a government environment where approval of forms is needed based on document flow from user to user. However, the creation of the documents is done using typical office software.

Another example is specialized document management that may be required in a medical field to ensure compliance with government regulations. Additionally, record keeping of communication and notes is needed to be added to a file for long term storage.

Another example is specialized scheduling and communication software that follows important office protocols to ensure that all parties receive needed communication.

Another example is specialized document management software for a construction firm that creates drawings for a construction project. Specialized document software is needed to ensure that drawing revisions are sent to the right individuals, and also ensures that the drawings are held when they are in the process of being revised.

All of these situations require one or more additional software products beyond the capabilities of typical office software.

Further complicating a cloud computing environment, the specialized software is often dynamic. That is, the software is liable to updating (revisions). The revisions may or may not work with other software in use, and the implementation of newer versions has to be watched for feedback and revisions by the supplying company.

Further complicating a cloud computing environment, users often find new paths to accomplishing tasks with other software or by use of other procedures. When such success is found, it should be shared with other users who are likely experiencing the same issue. It may be better for the IT department to monitor and facilitate changes that users generate, rather than roll out new features without the ability to obtain feedback. That is, it is better have capabilities to facilitate change from the ground up rather than the top down.

Further complicating a cloud computing environment is the dynamic nature of software contracts. The contract for software is often changeable and solutions currently in use may become much more expensive when un-needed features are rolled out by a software company. Also, the IT department may wish to test new specialized software as it becomes available, and the IT department may wish to monitor the effectiveness of new solutions.

It is difficult to monitor users of business software in a cloud environment. Users may not behave in ways the IT department anticipated, and the number of licenses and types of contracts/purchases may be inadequate for workloads. An industry report states that most users utilize 30-60% of their time looking for information and managing their workspace. It would be helpful to have the capability to collect data as to the use of particular software in terms of the numbers of users, and how much time each user worked with a particular software package. This information would allow a company to optimize use and expense of software.

Overall, as a practical matter, it is difficult to effectively monitor and implement a cloud computing environment in an office. The downsides may make an IT Department reluctant to participate in new and improved solutions.

BRIEF SUMMARY OF THE INVENTION

The invention is an eighth layer cloud administrative framework that provides for both monitoring users and providing needed software. The cloud framework guides software tool implementation so that users can accomplish business tasks efficiently. It also provides a collaborative workspace cloud spanning public and private cloud ecosystems with integrated, pluggable components such as chat tools, document sharing, adaptive business intelligence and a modular architecture allowing the system to expand as needed.

DETAILED DESCRIPTION OF THE INVENTION

Figure 1:
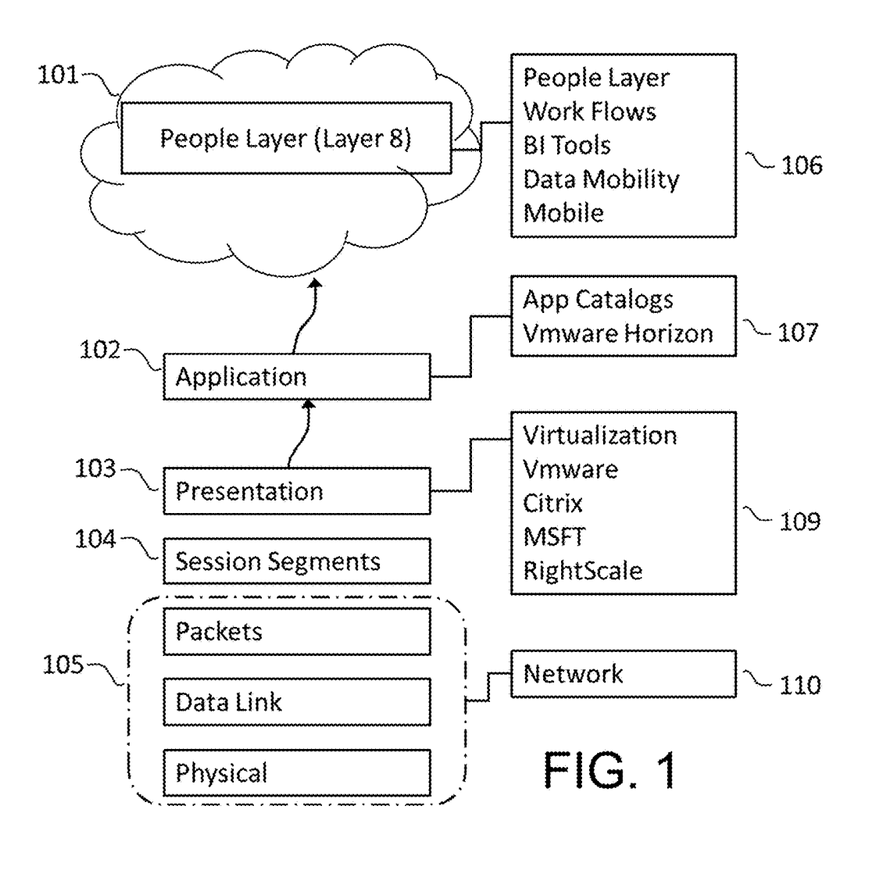
FIG. 1 shows an overview of the uni-cloud architecture.

FIG. 1 shows an overview of an 8th layer uni-cloud architecture that provides an administrative framework for monitoring and navigation of a path forward for cloud services. Users will be able to view cloud program and data services, access them, and utilize them for business functions.

The administrative monitoring determines if any program resource is redundant or utilizes some type of data/file protection. Usage information from any Application Programming Interface (API) is collected via an administrative configurable API using data mapping files and integration programs. The collected data is stored in a structured query language (SQL) database. The integration programs are distributed on one or more servers and configured to interface with a primary and back-up data collection program.

The goal of the administrative framework is to provide a simplified path forward for a general (non-IT) user, with the ability to obtain detailed information on important data.

Layer 8 provides a common interface for utilizing a mixture of cloud program and data services with common interface that can be deployed on a desktops and bring your own device (BYOD) without losing data access or security. Layer 8 utilizes existing data encryption, tunneling and data grid technologies to provide a common workspace on any platform and on local area networks, wide area networks and limited access in standalone mode.

Layer 8 provides the following features:
1) Architecture
  a) Distributed deployment
  b) Redundancy. A user sends copies of files over the Internet to the data server, which then records the information. When the user wishes to retrieve the information, he or she accesses the data server through a Web-based interface. The server then either sends the files back to the client or allows the client to access and manipulate the files on the server itself. (Cloud storage systems generally rely on hundreds of data servers for storing data and include backup features). This provides needed redundancy.
  c) Load balancing among users. Cloud Load Balancers manage online traffic by distributing workloads across multiple servers and resources—automatically or on demand. They maximize your workload performance and help prevent overload to help give your users a seamless experience.
  d) User configurable portal. The user may set up a personalized home page dashboard that allows the user to prioritize and arrange a work space according to personal preferences. The most used tools can be placed where they are easily accessible.
2) HTML 5
  a) Tablet support. Key features for mobile devices include: offline support, video and audio streaming support, and form fill in assistance.
  b) Encrypted file system. Either by use of a remote website or a local program.
  c) Offline synchronization. Files are synced (and backed up) automatically with a cloud based storage according to a user or system defined schedule.
3) SharePoint web-part
  a) Graphic User Interface (GUI). The user interfaces with the cloud system by use of an icon or app driven interface.
  b) Admin objects. The administrative staff add certain system programs for the user or system programs that keeping track of computer cloud resources.
  c) Drag & drop GUI controls. A simplified GUI interface keeps the file management system for the user in a drag and drop format.
4) Business Intelligence program tools—Business intelligence tools is a software program that is designed to retrieve, analyze, transform and report data for business intelligence. Statistics are also generated from stored data.
  a) Dashboard based (a single page, real-time user GUI that displays the current status of the user or cloud management system and key performance indicators.)
    i) Resource summary viewable by user
      (1) Availability of which programs and statistics are shown to the user.
      (2) Cloud Space available. The user is informed as to how much of their storage has been consumed and what is available.
      (3) Cloud description/type (i.e. company providing cloud services). The user is shown what they are connected to by showing what company or program is providing a particular service.
      (4) Datacenter name & location is shown for any programs or data that is stored in the cloud.
    ii) Geolocation (GeoIP) lookup is shown to the user and available to cloud services that require it.
    iii) Application information 102 is shown:
      (1) Programs (or apps) currently running on resource
      (2) Program (or app) URL.
    iv) Redundancy program or server is shown.
    v) Utilization monitoring by the administrative staff, or recorded for future reference.
    vi) Dependencies displayed via a Leslie Graph or similar display.
  b) Discovered for the user and displayed.
    i) Availability pie chart when it is a shared resource.
    ii) Top Ten charts information display to a user or system administrator:
      (1) CPU cycles for a user and for associated groups.

(2) Network information, i.e. connectivity and statistics.
(3) Disk storage utilization (i.e. space used)
(4) Disk throughput for the user.
(5) Document hits for shared files.
(6) Services/Application hits for shared programs.

5) Monitoring of the following cloud services
   a) Software as a Service (SaaS) components by resource consumption (data storage and CPU use).
   b) Internal Cloud Infrastructure (i.e. connectivity and hardware)
   c) External cloud infrastructure (i.e. connectivity and hardware)
   d) Data protection status
      i) When it is protected by backup program service, and
      ii) when it is backed up a Backup time stamp is applied/recorded.

6) Discovery program
   a) Poll and discover service metadata
   b) Agent based Front-cloud tunneling is done by transmitting data intended only for use within a private network through a public network in a special format so that that the nodes in the public network are unaware that the transmitted data is part of a private network.
   c) Metadata eDiscovery program. eDiscovery Metadata is done by using structured information that is available about an electronic file—that is embedded in the file. The structured information is not visible when viewing a printed or on screen rendition of the document. Often the structured data includes the data fields as well as descriptions of the data.

7) SSO (single sign-on) features. Access and control of multiple related, but independent software systems, is provided through only one login/password.

8) FIG. 1 shows the people (Layer 8) 101 which communicates with the work flows and tools individuals use 106. Various application catalogs 107 (example— Vmware Horizon) are used in various applications 102 which are part of the people layer. Any presentations put together utilizing Virtualization Vmware, Citrix, Microsoft, or RightScale are part of the applications 102. The interface includes session segments 104. Physical data communication 105 information is connected to internet 110.

Figure 2:
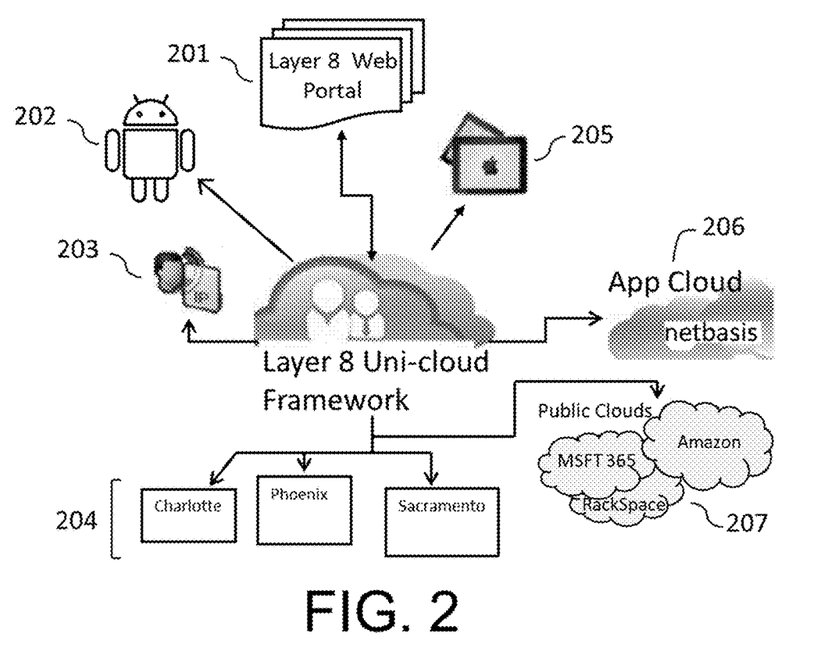
FIG. 2 shows a business intelligence back end program.

FIG. 2 shows Uni-cloud frame work component 208 overview

1) Uni-cloud frame work component overview
   a) Uni-cloud framework provides front-end business intelligence to a business that is focused navigation of different cloud architectures. The end user is able to add cloud resources, then group them into logical business functions. The added resources are discovered by a program and summary data is displayed next to the icon associated with the cloud type/vender.
   b) SAAS integration program (some examples) provides a high level of service quality so that programs run smoothly and have necessary access and resources. Programs include:
      i) Netbasis (for investors) 206
      ii) Quickbooks (Intuit)
      iii) Sharepoint (Microsoft)
   c) Off-site back-up 204 is provided to assure that a fire or other local catastrophe does not interrupt business.
   d) Infrastructure as a Service (IaaS) is provided by an external company such as:
      i) Internal cloud (vmware) software program.
      ii) Public clouds 207 such as
         (1) Amazon
         (2) Rackspace
   e) Voice over internet protocol (VOIP) clouds (audio communication over the internet).
   f) Mobile Apps (both Android & iOS based)
   g) Virtual Desktop services (such as VMware Horizon which includes Data as a Service)

2) The discovery program reads the XML map file, and queries provided network names for Web Services Description Language (WDSL) info identifying the service. The information will be catalogued by the collector Layer 8 database.

3) Unknown services will by default measure the response time.

4) The AI/Machine learning worker is custom fuzzy logic code using layer 8 advanced supervised learning engine allows layer 8 to discovered resources into a logical hierarchy, using a risk matrix table to dynamically provide directives using artificial intelligence to discover dependencies, business intelligence, workflows and solutions.

5) Drill action will navigate to the user configurable management GUI of the service 6) The layer 8 web portal 201, Android based equipment 202, VOIP 203, mobile tablets 205, and various applications in the cloud 206 all connect to the Layer 8 Uni-cloud framework.

Figure 3:
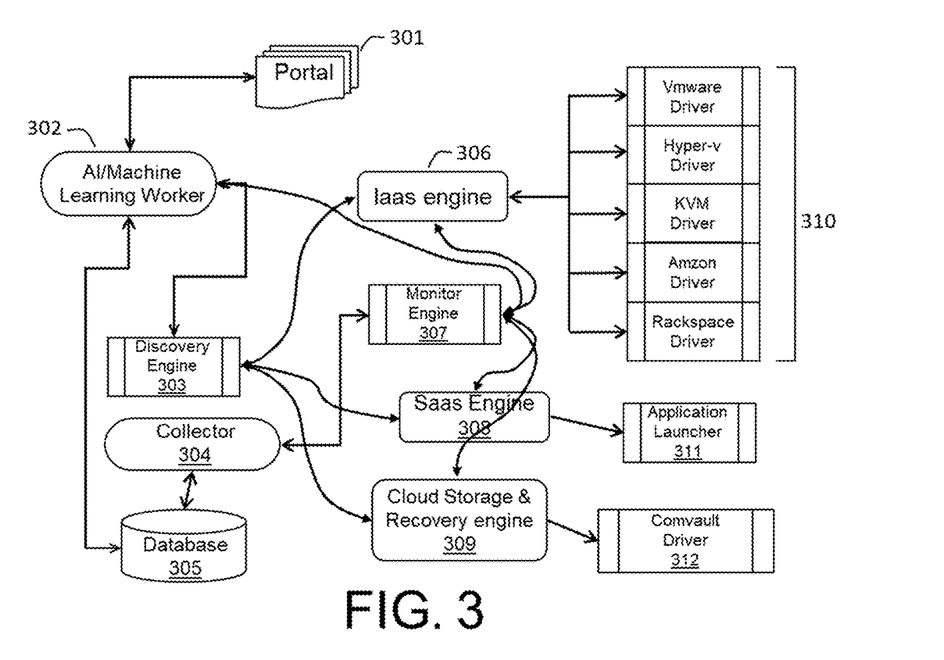
FIG. 3 shows a business intelligence program.

FIG. 3 shows a business intelligence back end program that will:

1. Business intelligence back end program 302.
   a. will register services in system
   b. will transmit inputs from portal 301 to the discovery service 303
      i) Application programming interface (API) URL
      ii) Admin URL
      iii) Credentials
      iv) Type
      v) Icon location (or use default)
   c. Creates service group objects
      i. Drill down to Sub Group detail
      ii. Drill Down to group service detail
2. Discovery service 303 will
   a. Route service to appropriate program
   b. Collect network location information for GeoIP use
3. Monitoring program 307 will
   a. Capture program service data
   b. Provide statistics (as available)
      i) CPU usage
      ii) Network usage
      iii) Disk space usage
      iv) Disk throughput and historical trending
   c. Watch Infrastructure as a Service (IaaS) program 306
   d. Watch SaaS program
   e. Be linked to Cloud recovery program 309
      i. Link to Management URL
      ii. Query data-recovery objects assigned to user from back-up systems
4. Query events and Job status
5. A collector 304 communicates with the database 305 and the monitor engine 307. The Saas Engine 308 communicates with the discovery engine 303 and the application launcher 311 and the monitor engine 307. Various drivers 310 communicate with the lass engine

306. An application launcher is directed by the Saas Engine, and the could storage and recovery engine 309 directs the Comvault Driver 312.

Figure 4:
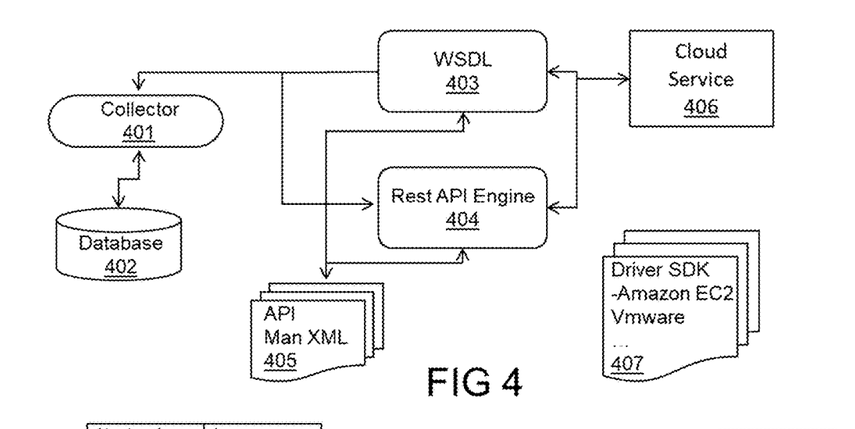
FIG. 4 shows details of a sample Infrastructure as a service program.

FIG. 4 shows details of a sample IaaS program that includes:
1. A cloud service program (IaaS)
2. Configuration that is stored in DB 402 and XML 405.
3. A software development kit (SDK) 407 if needed to consume application programming interface (API) 404.
4. Most Cloud services using Web Services Description Language (WSDL).
5. A URL that is provided from the discovery program via configuration.
6. A Driver work flow
   a. Once a driver is configured by the parameter provided from the discovery program, the data is stored on a config file for the resources.
   b. The config file naming convention will be "Driver Name_service url_date created." Alternatively, the data could be stored in a database.
   c. When services are installed, they will register with the monitor program(s). The monitor program will set up the connection context for the service. This context info will be stored in the system database.
7. The collector 401 communicates with the database 402 as well as the WSDL 403 and the Rest API Engine 404. The could service 406 communicates with the Rest API Engine 404 and the WSDL 408.

Figure 5:
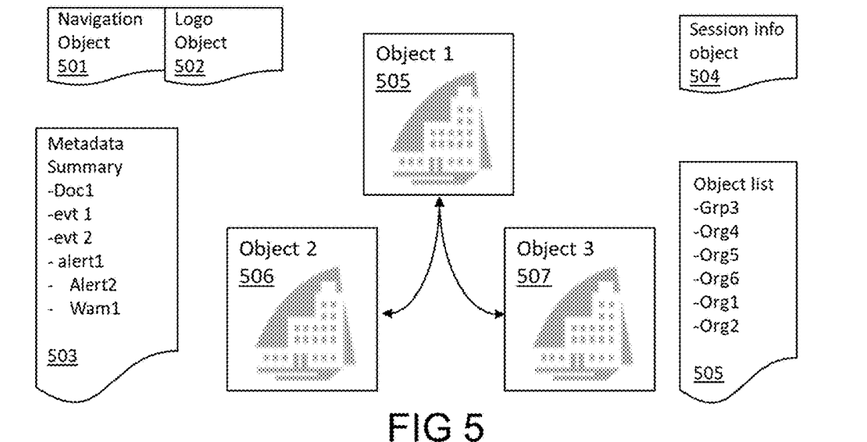
FIG. 5 is a Graphic User Interface.

FIG. 5 is a Graphic User Interface (GUI)
1. Layout is shown:
   a. SharePoint web-part is used to display the page.
   b. Html5-mobile compatible.
   c. Hierarchical organization.
   d. Objects can be assigned to Program status indicators for status tracking.
2. Object status
   a. Up-shown in green color
   b. <100% up—shown in yellow color
   c. Missing Config—shown in orange color
   d. Down/No response—shown in red color
3. Object Functions
   a. Navigation 501
      i. Bread crumb style by displaying (or making available) previous link backs to previously viewed pages
      ii. Layout admin
   b. Includes a Logo 502 to allow branding
      i. Uploaded image
   c. Session info 504
      i. Provided by a link to user account information
      ii. Provide account management
   d. Org objects 505, 506, 507—see group objects
   e. Org list
4. Metadata Summary 503

Figure 6A:
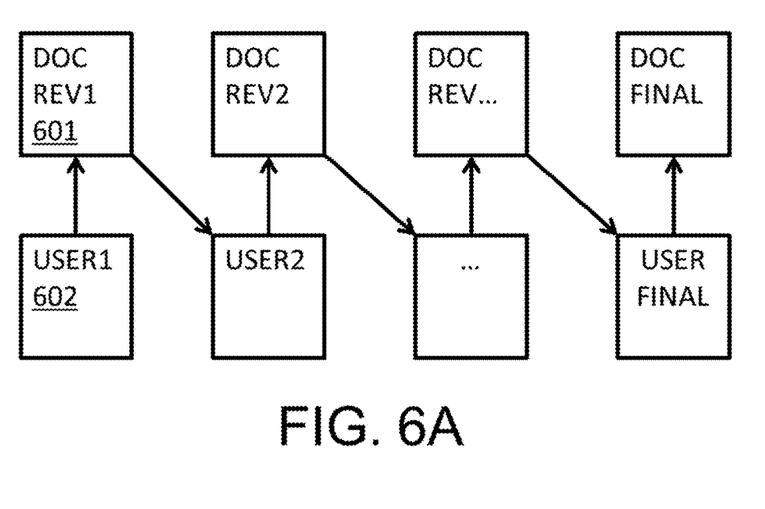
FIGS. 6A-6B shows simplified document flow between users until final disposition.
Figure 6B:
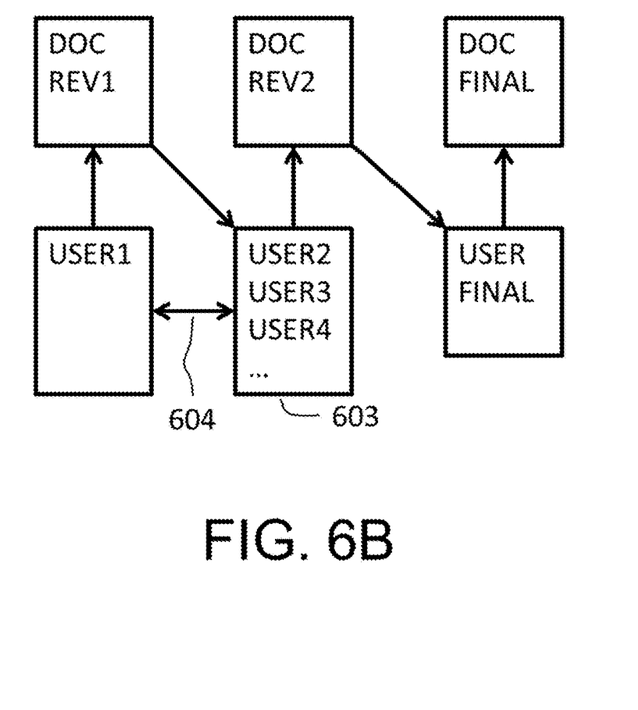

FIG. 6A shows document flow between users in a linear, direct user to user format. FIG. 6B shows a document flow between multiple users, such as a group, which provides communication or collaboration on a larger scale. In FIG. 6A, a first user (USER1) 602 generates a document (DOC-REV1) 601 that will be reviewed and modified by the second user (USER2) 604. The document is created by using office software or specialty software, or a combination of the two. A second revision to the document (DOC-REV2) 603 is then generated. USER2 may create a second revision by simply approving (or reviewing) the original DOC-REV1. USER1 and USER2 may communicate and collaborate in generating the second revision, or USER2 may work independently. This process of review/approval/modification continues until a final user disposes the final document revision. Typical final users would include a management person, a team or project leader, an attorney, a purchasing agent, a customer, or a vendor.

In a general sense, DOC1 may include a basic form or communication document, as well as a number of supporting documents. DOC1 may be a compilation of documents and forms.

FIG. 6B shows document flow between users where the revision is done in a group collaboration. A first USER1 generates a first document DOC-REV1 for review by a group of users (USER1, USER2, etc.) 606. The group of users then modify, review, add supporting documentation, and approve/disapprove 605 the DOC-REV1 before forwarding to a Final user. The document flow is monitored by time of use (i.e. modification, review, or approval) by each user, and the time of use is reported to the user and administrative staff. This information is useful for optimizing the cloud administrative system. The optimization would include configuring the office software and any specialized software for optimization.

The movement of the document and associated revisions is monitored for when it is generated and when the next revision is completed. The monitoring program for documents then keeps track of all important documents that move among users. The timeliness to the final disposition is then monitored and logged in a database, and reported to the users that are involved with the document and administrative staff.

Figure 7:
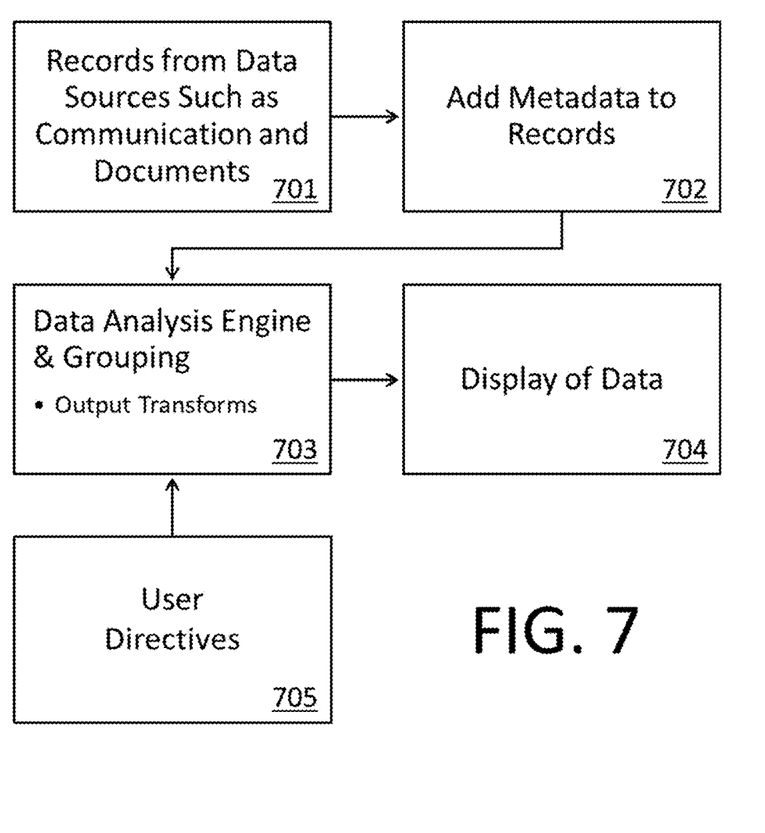
FIG. 7 shows the use of meta data and a way to provide organization to a record.

FIG. 7 shows the use of meta data and a way to provide organization to a record that is generated from a source typically found in an office. For example, data records from communication and documents 701 such as phone calls, voice mails, emails, email attachments, documents placed in a location to be used in collaborative effort between individuals, music files, video files, snippets from the internet, news items, links to internet addresses of interest, purchase orders, invoices, records of work hours, tests, type of computer equipment used, records of popular sites visited by individuals in the office, files used for references, training documents, troubleshooting documents, financial results, performance results, software usage, software license information, and ongoing expenses, among other items. Each of these items can be cataloged in a data record, but since there is often a wide dispersion of sources and types of data, it is important to organize and categorize this data. A set up adds metadata to each record for identifying it 702. The metadata identifies the type, size, origination, timing, and individuals involved, by adding additional fields to the data record. To organize the wide disparity of information into an understandable framework, a data analysis engine 703 performs grouping of the individual records (including meta data) and organizes it according to a user defined directives 705. The user provides for some framework, but the data analysis engine utilizes a machine learning algorithm such as Bayesian analysis or theory. Bayesian analysis uses statistics to answer questions about unknown parameters by determining probabilities. It can enhance grouping by finding statistically significant connections between data records. The grouping output of the analysis is then displayed (presented) 704 to a user through a user interface such as a computer display.

While various embodiments of the present invention have been described, the invention may be modified and adapted to various operational methods to those skilled in the art. Therefore, this invention is not limited to the description and

We claim:

1. A computer implemented method for facilitating cloud administration via a computer network, the method comprising causing at least one processor to execute a plurality of instructions for:
   a) providing a graphical interface for a plurality of users utilizing a cloud computer network,
   b) providing office document software for use by said users via said graphical interface, wherein said office document software is accessed via said cloud computer network,
   c) providing customized document software for use by said users via said graphical interface,
   d) monitoring time of use of said office document software and said customized document software, wherein said time of use is reported to said user and administrative staff,
   e) monitoring document flow generated by said users by use of a database, wherein said document flow is monitored by volume and timeliness to a completed revision,
   f) wherein said document flow is reported to said user and administrative staff,
   g) wherein any documents generated by said users are backed up via said cloud computer network,
   h) wherein communication between external and internal sources in said computer network generate a plurality of communication records,
   i) wherein each said communication record is analyzed and associated metadata fields are created and added to said communication records,
   j) wherein each said communication record is analyzed according to a Bayesian analysis algorithmic method to add grouping fields to said communication records, and
   k) wherein said associated metadata fields are structured information that is embedded in the file,
   whereby said time of use and said document flow are utilized to
   1) monitor said cloud computer network and
   2) configure said office document software and said customized software for optimization.

2. The computer implemented method according to claim 1 wherein said office document software is at least one item selected from the list consisting of:
   a) word processing,
   b) spreadsheet,
   c) presentation,
   d) email management,
   e) calendar, and
   f) accounting software.

3. The computer implemented method according to claim 1 wherein said customized document software is document management in an environment from at least one item selected from the list consisting of:
   a) a government environment,
   b) a medical environment, or
   c) a construction environment.

* * * * *